(12) United States Patent
Tokairin et al.

(10) Patent No.: US 6,232,998 B1
(45) Date of Patent: May 15, 2001

(54) DOUBLE SIDE PRINTING APPARATUS

(75) Inventors: Motohiro Tokairin; Amiko Chihara; Yoshinori Wada, all of Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/286,468

(22) Filed: Apr. 6, 1999

(30) Foreign Application Priority Data

Jun. 11, 1998 (JP) .................................................. 10-316216

(51) Int. Cl.[7] .................. B41J 2/435; B41J 2/45; G01D 9/06
(52) U.S. Cl. .................. 347/234; 347/248; 347/116; 346/44
(58) Field of Search ............................... 347/237, 240, 347/116, 234, 248; 346/44

(56) References Cited

U.S. PATENT DOCUMENTS

| | | | |
|---|---|---|---|
| 4,774,524 | * 9/1988 | Warbus et al. | 346/44 |
| 5,072,244 | * 12/1991 | Aoki et al. | 347/116 |
| 5,315,320 | * 5/1994 | Murano | 347/237 X |
| 5,406,386 | * 4/1995 | Yamada | 358/406 |
| 5,765,081 | * 6/1998 | Bogaert et al. | 399/299 |
| 5,829,707 | * 11/1998 | Lamothe | 242/538.2 |

* cited by examiner

Primary Examiner—David F. Yockey
(74) Attorney, Agent, or Firm—Armstrong, Westerman, Hattori, McLeland & Naughton, LLP

(57) ABSTRACT

A printing apparatus for printing on double-sides of a recording medium has a first print control unit for controlling an one-line exposure for the right or reverse side by a horizontal synchronous signal, and a second print control unit for controlling the one-line exposure for the reverse or right side by using this horizontal synchronous signal. A print start timing for the right side can be synchronized with a timing for the reverse side, and is capable of preventing a deviation in print position between the right side and the reverse side of the recording medium even by providing the print control units for the right side and the reverse side, individually.

12 Claims, 9 Drawing Sheets

DOUBLE SIDE PRINTING APPARATUS

BACKGROUND OF THE INVENTION

1. Field of the Invention

The present invention relates generally to a double side printing apparatus for printing on double sides of a recording medium and, more particularly, to a double side printing apparatus for minimizing a printing positional deviation between right and reverse sides thereof.

2. Related Background Art

A printing apparatus has been widely utilized as an output apparatus of a computer. An electrophotographic apparatus capable of printing on an ordinary sheet of paper has been utilized as the printing apparatus. In response to a demand for saving natural resources in recent years, a double side printing (perfecting) apparatus for printing on double sides of the sheet has been required. Then, an apparatus provided with both a mechanism for printing on the right side of the recording medium and a mechanism for a printing mechanism for printing on the reverse side of the recording medium, is required for increasing a printing speed.

FIG. 9 is an explanatory view showing the prior art.

The perfecting apparatus includes a printing unit 9b for printing on the right side of a sheet of recording paper PP(which is hereafter simply referred to as the sheet PP), and a printing unit 9a for printing on the reverse side of the sheet PP. The reverse side printing mechanism 9a has a photosensitive drum 90. The photosensitive drum 90 is charged by a pre-charger 91 and thereafter exposed to a light image by an exposing unit 92. The exposing unit 92 serves to scan one line on the photosensitive drum 90. An electrostatic latent image corresponding to the light image is thereby formed on the photosensitive drum 90. The latent image on the photosensitive drum 90 is developed by a developing unit 93. Then, the developed image on the photosensitive drum 90 is transferred onto the sheet PP by a transferring unit 94. Thus, the image is printed on the reverse side of the sheet PP.

The printing on the right side of the sheet PP is likewise performed. To be specific, the right side printing mechanism 9b has a photosensitive drum 95. The photosensitive drum 95 is charged by a pre-charger 96 and thereafter exposed to a light image by an exposing unit 97. An electrostatic latent image corresponding to the light image is thereby formed on the photosensitive drum 95. The latent image on the photosensitive drum 95 is developed by a developing unit 98. Subsequently, the developed image on the photosensitive drum 95 is transferred onto the sheet PP by a transferring unit 99. Thus, the image is printed on the right side of the sheet PP.

The perfecting apparatus has the two printing mechanisms which each prints on the single side of the sheet PP. It is required that a printing control unit for controlling the printing mechanism be provided for the printing mechanism. The printing control unit performs the control so that the exposing unit of the printing mechanism executes a one-line exposure in accordance with a printing start timing.

The printing apparatus has one printing control unit and therefore is, it has hitherto been practiced, provided with the printing control units for controlling the two printing mechanisms.

There arise, however, the following problems inherent in the prior art.

First, a method of providing a common control unit for controlling the two print mechanisms involves desinging a common print control unit different from a print control unit of a one-side printing apparatus for printing on one side. Therefore, the print control unit of the perfecting apparatus can not be used for the print control unit of the one-side printing apparatus, resulting in such a problem that the costs light increase.

Second, according to a method of providing each individual printing mechanism with the print control unit, the above print control unit can be used for the print control unit of the one-side printing apparatus, which is advantageous in terms of the costs. However, the two print control units are independently controlled, and therefore the print start timing for the right side is asynchronous with the print start timing for the reverse side, which conduces to such a problem that a print position on the right side deviates from a print position on the reverse side.

SUMMARY OF THE INVENTION

It is a primary object of the present invention to provide a perfecting apparatus capable of preventing a deviation in print position between a right side and a reverse side of a recording medium even by using print control units for the right side and the reverse side, individually.

It is another object of the present invention to provide a perfecting apparatus capable of preventing the deviation in the print position between the right side and the reverse side even by controlling the right side and the reverse side, independently.

It is a further object of the present invention to provide a perfecting apparatus capable of controlling independently the print positions on the right side and the reverse side even by controlling in synchronization the right side and the reverse side.

To accomplish the above objects, according to a first aspect of the present invention, a perfecting apparatus for executing prints on double-sides of a recording medium, comprises a first image forming unit for forming an image on one surface of the recording medium by exposing an image on one line to the light from a first exposure source, a second image forming unit for forming an image on the other surface of the recording medium by exposing an image on one line to the light from a second exposure source, a first print control unit for controlling the one-line image exposure by the first exposure source in accordance with a horizontal synchronous signal, and a second print control unit for controlling the one-line image exposure by the second exposure source, synchronizing with the horizontal synchronous signal.

According to the present invention, the perfecting apparatus is provided with the first print control unit for controlling the one-line exposure for the right side or the reverse side in accordance with the horizontal synchronous signal, and the second print control unit for controlling the one-line exposure for the reverse side or the right side by use of this horizontal synchronous signal. Thus, a print start timing on the right side is synchronized with a print start timing on the reverse side, and it is therefore feasible to prevent a deviation in print position between the right side and the reverse side even by providing the print control units for the right side and the reverse side. Further, since the horizontal synchronous signal is used, this can be easily attained.

According to a second aspect of the present invention, the perfecting apparatus further comprises a delay circuit for generating a second horizontal synchronous signal obtained by delaying the former horizontal synchronous signal, and the second print control unit operates synchronizing with the second horizontal synchronous signal.

According to a third aspect of the present invention, the delay circuit is constructed of a delay circuit capable of making a delay quantity variable. The delay quantity is variable, and hence it is possible to adjust start-of-print positions on the right and reverse sides in accordance with a distance between a reverse-side transfer position and a right-side transfer position and with positions where exposing units are disposed.

According to a fourth aspect of the present invention, the first print control unit includes a first generation circuit for generating the horizontal synchronous signal, a first select circuit for selecting any one of the horizontal synchronous signal generated and a horizontal synchronous signal given from outside, and a first control circuit for controlling an exposure of an image on one line to the light from the first exposure source in accordance with the selected horizontal synchronous signal. The second print control unit includes a second generation circuit for generating the horizontal synchronous signal, a second select circuit for selecting any one of the horizontal synchronous signal generated and a horizontal synchronous signal given from outside, and a second control circuit for controlling an exposure of an image on one line to the light from the second exposure source in accordance with the selected horizontal synchronous signal.

Then, the first select circuit of the first print control unit is so set as to select the horizontal synchronous signal given from the first generation circuit, and the second select circuit of the second print control unit is so set as to select the horizontal synchronous signal given from the first generation circuit.

The right- and reverse-side print control units are provided with the signal select circuits and are given the same circuit construction. Therefore, the print control units are composed of LSIs and can be mass-produced. Accordingly, the costs for the print control units can be reduced.

According a fifth aspect of the present invention, the first print control unit controls the exposure of the image on one line to the light from the first exposure source, and the second print control unit controls the exposure of the image on one line to the light from the second exposure source in accordance with the same clock as the reference clock. The reference clock for the right side is shared with the reverse side, and hence a print start potion on the reverse side can be made coincident with a print start position on the right side.

According to a sixth aspect of the present invention, the first print control unit includes a first generation circuit for generating a reference clock, a first select circuit for selecting any one of the reference clock generated and a clock given from outside, and a first control circuit for controlling the exposure of the image on one line to the light from the first exposure source in accordance with the selected clock. The second print control unit includes a second generation circuit for generating a reference clock, a second select circuit for selecting any one of the reference clock generated and a clock given from outside, and a second control circuit for controlling the exposure of the image on one line to the light from the second exposure source in accordance with the selected clock.

Then, the first select circuit of the first print control unit is so set as to select the generated reference clock, and the second select circuit of the second print control unit is so set as to select the clock given from the first generation circuit.

The circuits of the clocks for the right and reverse sides take the common form, and consequently the print control units have the same circuit configuration. Therefore, the print control units are composed of the LSIs and can be thereby mass-produced. Accordingly, the costs for the print control units can be reduced.

According to a seventh aspect of the present invention, the second print control unit is provided with a buffer memory for storing print data having a quantity corresponding to a distance from an image forming position on the recording medium of the first image forming unit to an image forming position on the recording medium of the second image forming unit.

It is therefore feasible to prevent the deviation in the print position between the right side and the reverse side without the host device operating the data on the right and reverse sides even when the transfer position on the right side is apart from the transfer position on the reverse side.

According to an eighth aspect of the present invention, the perfecting apparatus further comprises a first selector for switching over the print data to the first print control unit from the second print control unit, and a second selector for outputting the print data from the first print control unit to the second exposure source of the second image forming unit.

Consequently, the second image forming unit performs the printing on one side by use of the first print control unit requiring no buffer memory, and hence there is an advantage of requiring no buffer memory when the perfecting apparatus is diverted to the one-side printing apparatus.

According to a ninth aspect of the present invention, the first exposure source and the second exposure source are disposed so that scan directions of the first exposure source and of the second exposure source are opposite to each other. Consequently, the shift directions of the print data on the right and reverse sides are opposite to each other, and hence there is no necessity for the control unit to execute a complicated operation of reversing the print data on the right and reverse sides.

According to a tenth aspect of the present invention, the first print control unit further includes a shift circuit for shifting the one-line print data in accordance with a width of the recording medium. It is therefore possible to change a print original point of the one-line print data on the reverse side without changing a print original point on the right side.

According to an eleventh aspect of the present invention, the first image forming unit includes a first photosensitive drum exposed to an image of the light from the first exposure source, a first developing unit for developing the image on the first photosensitive drum, and a first transferring unit for transferring the image on the first photosensitive drum onto one surface of the recording medium. The second image forming unit includes a second photosensitive drum exposed to an image of the light from the second exposure source, a second developing unit for developing the image on the second photosensitive drum, and a second transferring unit for transferring the image on the second photosensitive drum onto the other surface of the recording medium.

According to the eleventh aspect, the right- and reverse-side image forming units are constructed of electrophotographic mechanisms, whereby the prints on the double side of an ordinary sheet of paper can be attained.

According to twelfth aspect of the present invention, each of the first exposure source and the second exposure source is composed of an LED print head. The print positions on the double sides can be adjusted depending on where the LEDs are disposed, and the double-side printing can be easily executed.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DESCRIPTION OF THE PREFERRED EMBODIMENTS

Figure 1:
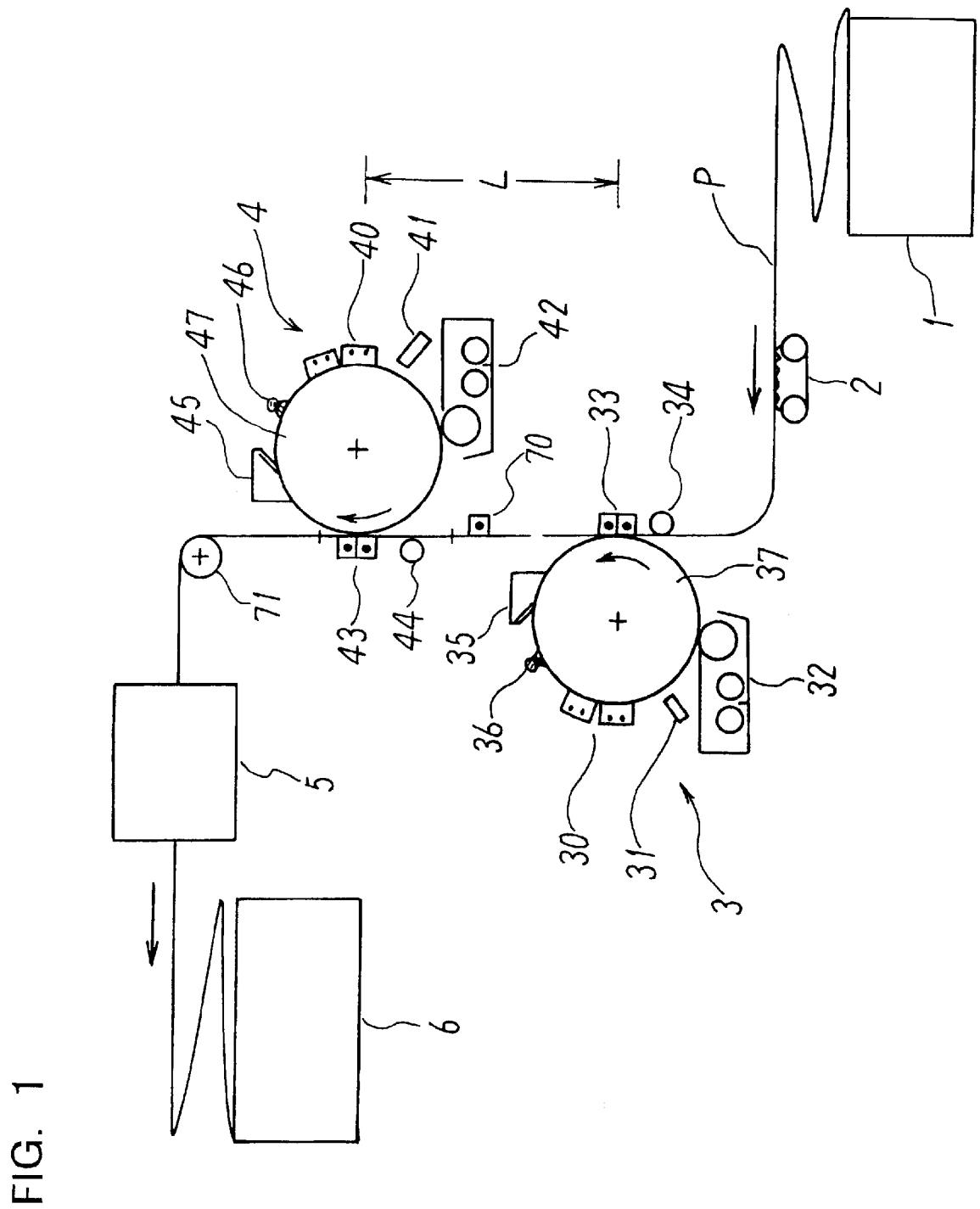
FIG. 1 is a view showing a construction of a perfecting apparatus in one embodiment of the present invention.

FIG. 1 is a view showing a construction of a perfecting apparatus in one embodiment of the present invention.

FIG. 1 illustrates a perfecting apparatus for effecting prints on double sides of a continuous sheet of paper having feed perforations. A hopper 1 is stacked with unprinted continuous sheets of paper P. A sheet carrier tractor 2 engages with the feed perforations of the continuous sheet P and thus carries the continuous sheet P in an arrow direction. A reverse side printing mechanism 3 is constructed of an electrophotographic printing mechanism, and effects printing on the reverse side of the continuous sheet P.

This reverse side printing mechanism 3 includes a photosensitive drum 37, a charging unit 30 for charging the photosensitive drum 37 with electricity, and an LED head 31 for having the photosensitive drum 37 exposed to a one-line light image. This LED head 31 is composed of an LED array where LEDs (light emitting diodes), the number of which is set corresponds to one line, are arrayed.

A developing unit 32 develops a latent image on the photosensitive drum 37. A transfer charging unit 33 transfers, onto the continuous sheet P, the developed image on the photosensitive drum 37. A transfer guide roller 34 presses the continuous sheet P against the photosensitive drum 37. The transfer guide roller 34 retreats when in a non-transfer process, and the continuous sheet P is prevented from coming into contact with the photosensitive drum 37. A cleaner 35 collects residual toners on the photosensitive drum 37. A de-electrifying lamp 36 removes a residual potential out of the photosensitive drum 37.

A right side printing mechanism 4 is also composed of an electrophotographic printing mechanism, and implements the printing on the right side of the continuous sheet P. The right side printing mechanism 4 is disposed downstream of the reverse side printing mechanism 3 in a sheet carrying direction.

This right side printing mechanism 4 includes a photosensitive drum 47, a charging unit 40 for charging the photosensitive drum 47 with electricity, and an LED head 41 for having the photosensitive drum 47 exposed to a one-line light image. This LED head 41 is composed of an LED array where LEDs (light emitting diodes), the number of which is set corresponds to one line, are arrayed.

A developing unit 42 develops the latent image on the photosensitive drum 47. A transfer charging unit 43 transfers, onto the continuous sheet P, the developed image on the photosensitive drum 47. A transfer guide roller 44 presses the continuous sheet P against the photosensitive drum 47. The transfer guide roller 44, when in the non-transfer process, retreats and thus prevents the continuous sheet P from coming into contact with the photosensitive drum 47. A cleaner 45 collects residual toners on the photosensitive drum 47. A de-electrifying lamp 46 removes a residual potential out of the photosensitive drum 47.

A neutralization charging unit 70 is provided between the reverse side printing mechanism 3 and the right side printing mechanism 4, and neutralizes an electric potential on the right side of the continuous sheet P assuming the electric potential through the reverse side printing mechanism 3. The transferring operation can be thereby performed with a stability in the right side printing mechanism 4.

A guide roller 71 diverts in a horizontal direction the continuous sheet P carried in the vertical direction, and thus guides the sheet P to the fixing unit 5. The fixing unit 5 is constructed of a flash fixing unit, and fixes the toner images on the double sides of the continuous sheet P. A stacker 6 is stacked with the printed continuous sheets P.

In this perfecting apparatus, the reverse side printing mechanism 3 starts printing in advance of the right side printing mechanism 4. Further, a carrying path is set in a vertical direction, and the reverse and right side printing mechanisms 3, 4 are provided with this carrying path interposed therebetween. The perfecting apparatus can be therefore downsized.

Figure 2:
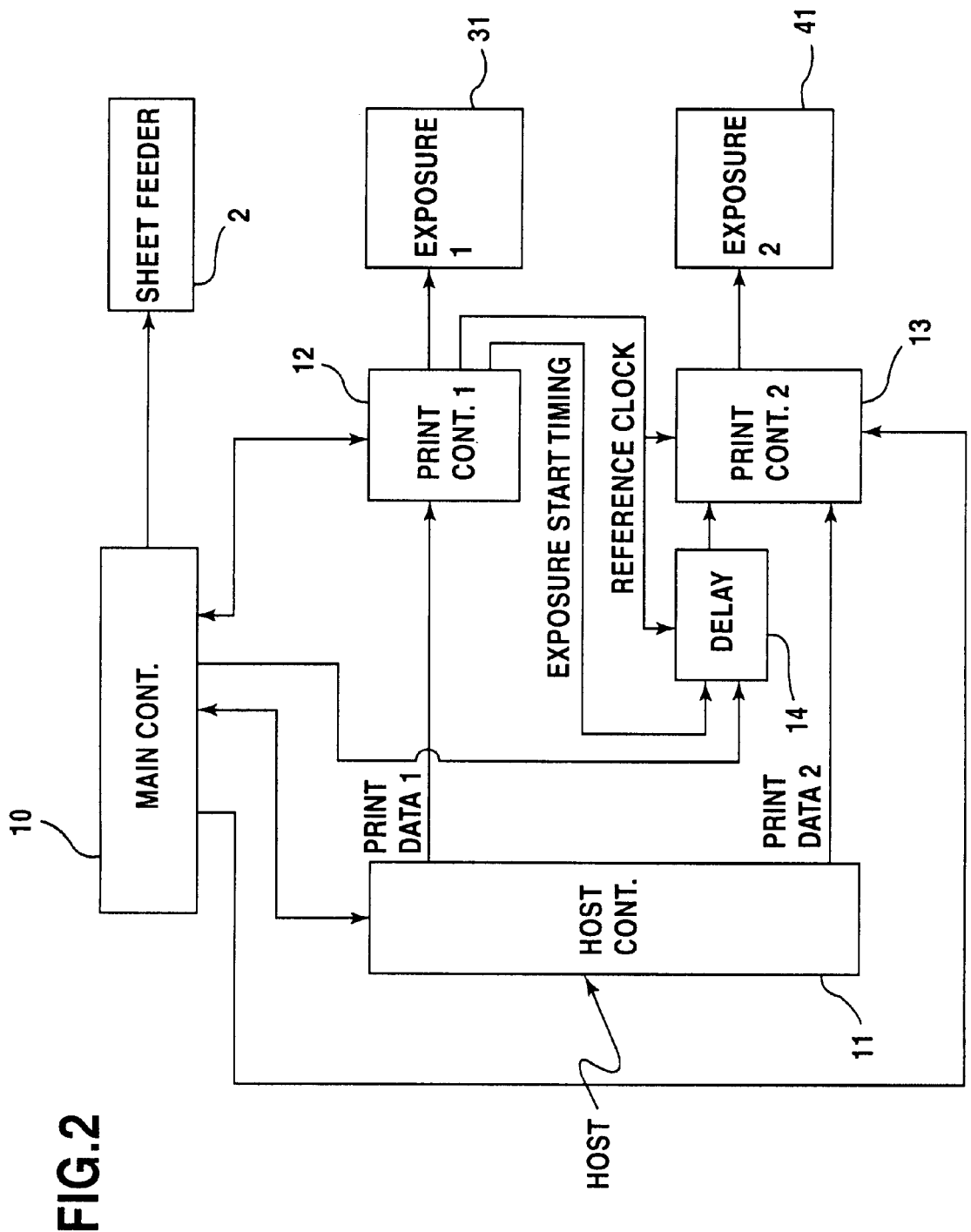
FIG. 2 is a block diagram showing the perfecting apparatus in one embodiment of the present invention.
Figure 3:
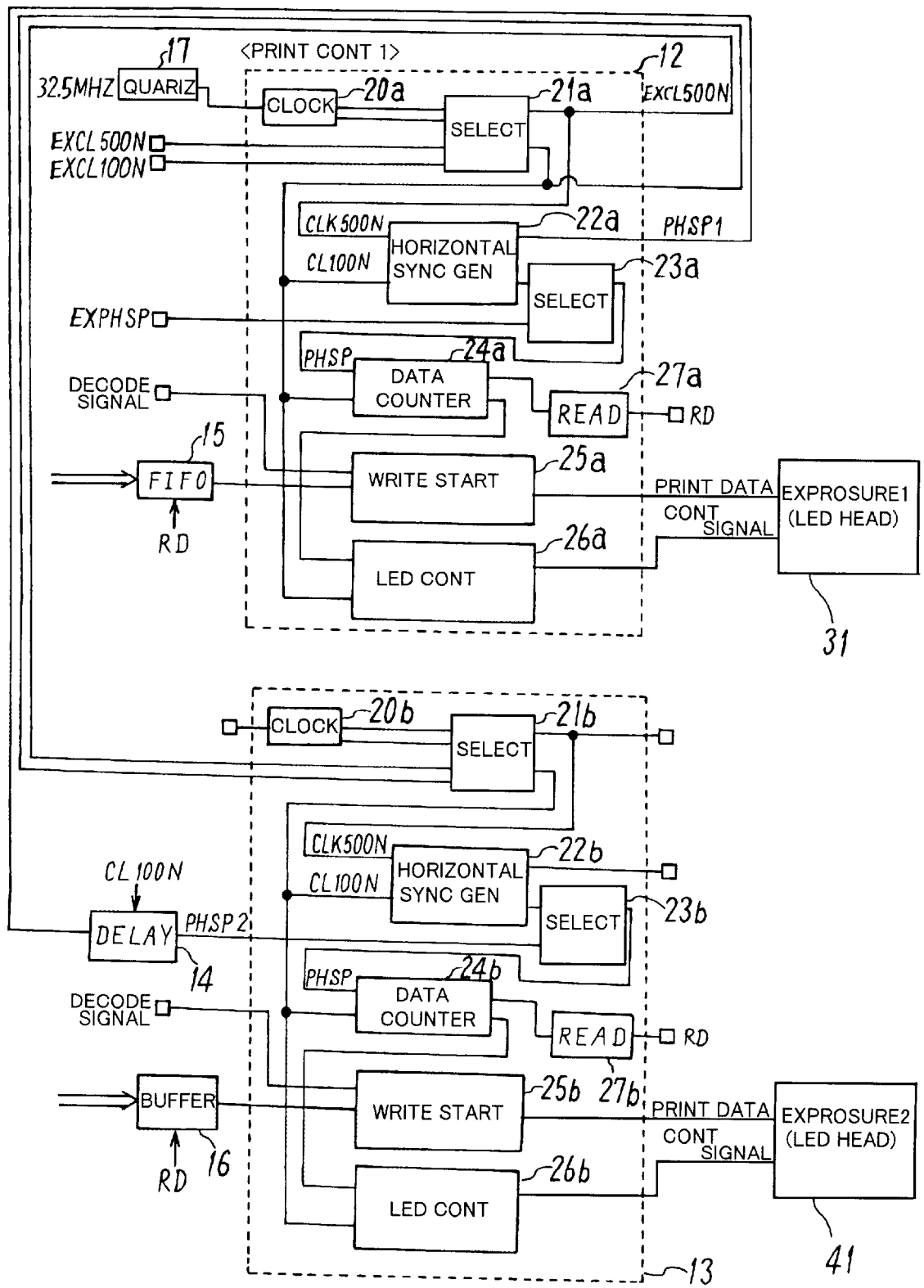
FIG. 3 is a circuit diagram of a print control unit in FIG. 2.
Figure 4:
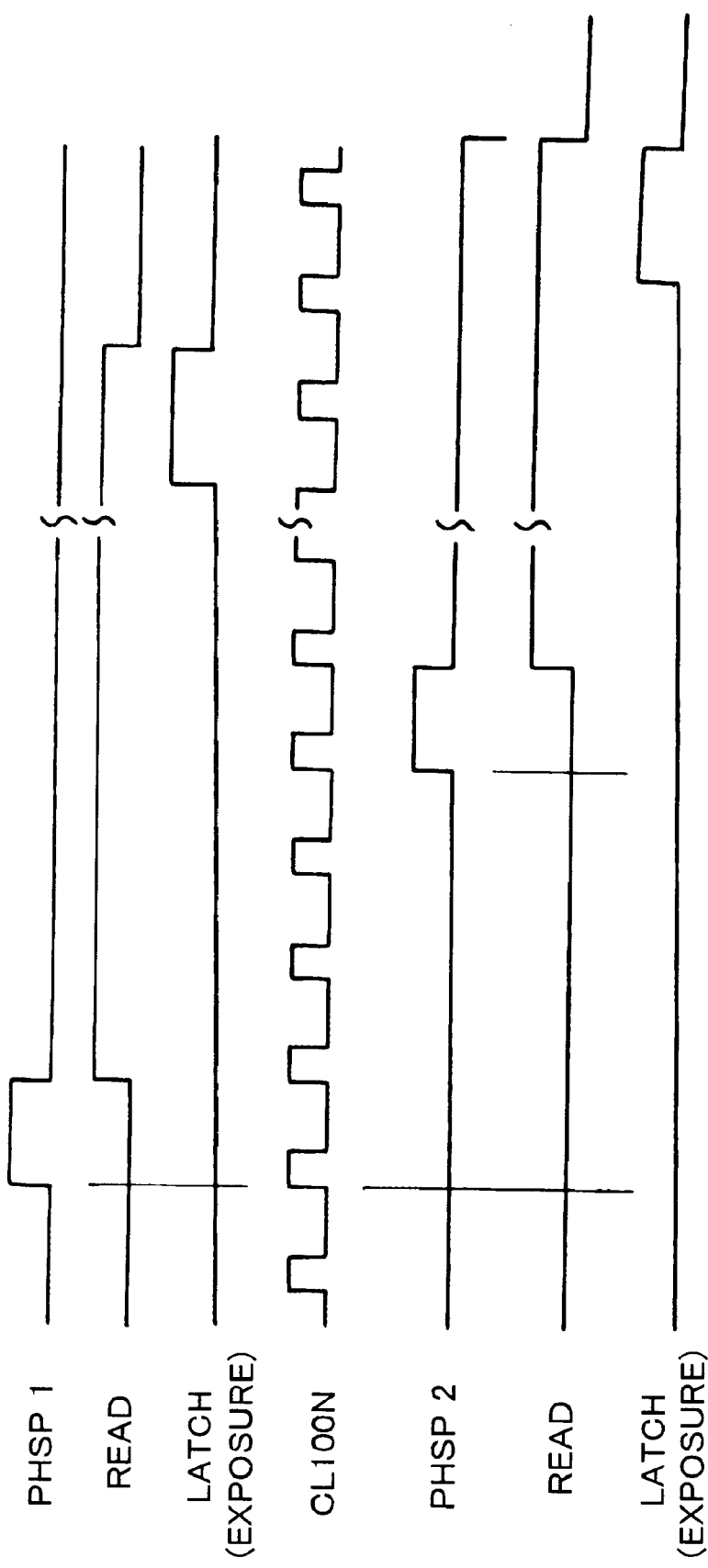
FIG. 4 is a time chart in one embodiment of the present invention.

FIG. 2 is a block diagram showing a printing control device in one embodiment of the present invention. FIG. 3 is a circuit diagram of the printing control unit in FIG. 2. FIG. 4 is a time chart of the printing control unit in FIG. 2. A microprocessor-based main control unit 10 controls respective units which will hereinafter be explained. A host control unit 11 develops print data to be transferred from a host computer, and outputs print data 1 on the reverse side and print data 2 on the right side. A first print control unit 12 controls the LED head 31 for the reverse side of the sheet. To be more specific, the print control unit 12 generates a horizontal synchronous signal PHSP1, then outputs the print data on the reverse side line by line to the reverse-side LED head 31 in accordance with this horizontal synchronous signal PHSP1 (see FIG. 3), and outputs a print control signal (see FIG. 3) to the reverse-side LED head 31.

A second print control unit 13 controls the LED head 41 for the right side of the sheet. That is, the print control unit 13 outputs the print data on the right side line by line to the right-side LED head 41 in accordance with the horizontal synchronous signal PHSP1 and a reference clock CL100N (see FIG. 3), and outputs the print control signal (see FIG. 3) to the right-side LED head 41.

The first and second print control units 12, 13 are, as will be explained later on referring to FIG. 3, constructed of the same circuits. Then, the second print control unit 13 controls the printing on the basis of the horizontal synchronous signal PHSP1 generated by the first print control unit 12 and the reference clock CL100N. A delay unit 14 delays by a predetermined quantity the horizontal synchronous signal PHSP1 transmitted from the first print control unit 12, and thereby generates a horizontal synchronous signal PHSP2 for controlling the print on the right side.

Based on this construction, the first print control unit 12 generates the horizontal synchronous signal PHSP1 for controlling a start-of-exposure timing, and controls the printing in accordance with this horizontal synchronous signal PHSP1. Then, the second print control unit 13 controls the printing in accordance with the horizontal synchronous signal PHSP1 generated by the first print control unit 12. Therefore, even when each of the reverse- and right-side printing mechanisms is provided with the print control units 12, 13, the print control on the reverse side of the sheet can be synchronized with the print control on the right side thereof. Accordingly, it is feasible to prevent a deviation of print position on the right side from that on the reverse side even when provided with the right- and reverse-side print control units.

Further, the reverse-side LED head 31 starts exposing in advance of the right-side LED head 41. Moreover, after a predetermined time has elapsed since the exposure by the LED head 31 was started, it is required that an exposure by the LED head 41 be started depending on how the two LED heads 31, 41 are disposed and on positions where these two LED heads 31, 41 are disposed.

Therefore, the delay unit 14 generates the right-side horizontal synchronous signal PHSP2 into which the horizontal synchronous signal PHSP1 for the reverse side is delayed by the predetermined time. The print positional deviation between the right and reverse sides of the continuous sheet can be prevented by controlling the above delay time irrespective of a difference between positions of transferring onto the continuous sheet.

The delay time given by this delay unit 14 can be adjusted corresponding to a distance between a reverse-side transfer position and a right-side transfer position and to the positions where the LED heads are disposed. For instance, the delay unit 14 may be constructed of a counter. Then, a delay quantity is loaded into the counter, and the horizontal synchronous signal PHSP1 is delayed by the delay quantity, thus generating the second horizontal synchronous signal PHSP2. This delay quantity is set by the main control unit 10.

It is desirable that a write start position to the sheet in the sheet carrying direction be adjusted on the right and reverse sides independently in addition to controlling the relative print positional deviation between the right side and the reverse side. Therefore, a print start position in which to be exposed by the reverse-side LED head 31 is adjusted by making variable a carrying start timing of the sheet carrying unit 2 in FIG. 2. The main control unit 10 controls the carrying start timing of this sheet carrying unit 2. Then, the print start position of being exposed by the right-side LED head 41 is adjusted by the delay time of the delay unit 14 which corresponds to a variable quantity of the sheet carrying timing. The main control unit 10 controls the delay time of the delay unit 14.

With the operation thus executed, the start-of-print position on the sheet can be adjusted both on the right side and on the reverse side, independently.

Next, the print control units 12, 13 will be explained in greater details with reference to FIG. 3.

The print control unit 12 includes a clock generation circuit 20a, a signal select circuit 21a, a horizontal synchronous signal generation circuit 22a, a signal select circuit 23a, a data counter 24a, a start-of-print position adjusting circuit 25a, and an LED light emitting control circuit 26a.

The print control unit 13 also includes a clock generation circuit 20b, a signal select circuit 21b, a horizontal synchronous signal generation circuit 22b, a signal select circuit 23b a data counter 24b, a start-of-print position adjusting circuit 25b, and an LED light emitting control circuit 26b.

The clock generation circuits 20a, 20b are constructed of frequency dividing circuits, and generate reference clocks CL500N, CL100N from clocks of a quartz oscillator 17 provided outside. The signal select circuits 21a, 21b, to which the reference clocks CL500N, CL100N from the clock generation circuits 20a, 20b and reference clocks EXCL500, EXCL100N from outside are inputted, selectively output the generated reference clocks CL500N, CL100N and the reference clocks EXCL500N, EXCL100N from outside in accordance with selection setting.

The horizontal synchronous signal generation circuits 22a, 22b count the reference clocks CL500N, CL100N from the signal select circuits 21a, 21b, and generate horizontal synchronous signals having a period corresponding to a set sheet width.

The signal select circuits 23a, 23b, to which the horizontal synchronous signals PHSP from the horizontal synchronous signal generation circuits 22a, 22b and the horizontal synchronous signal EXPHSP from outside are inputted, selectively output the generated horizontal synchronous signal PHSP and the horizontal synchronous signal EXPHSP from outside in accordance with selection setting.

The data counter circuits 24a, 24b are constructed of counters for counting the reference clocks CL100N, synchronizing with the horizontal synchronous signals from the signal select circuits 23a, 23b. Outputs of the data counter circuits 24a, 24b each indicate a position of each piece of data (dot data) from the horizontal synchronous signals.

Figure 6:
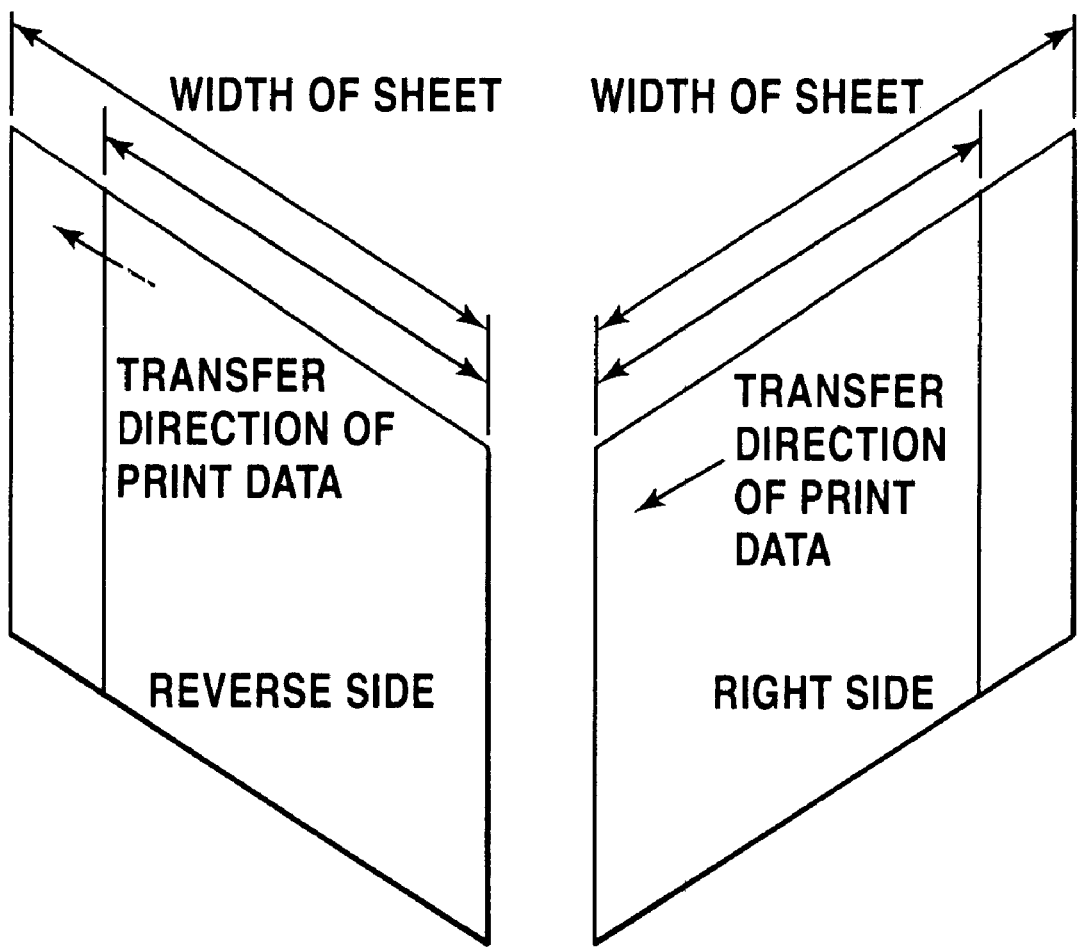
FIG. 6 is an explanatory diagram showing a start-of-print position of the LED head in FIG. 5.

The start-of-print position adjusting circuits 25a, 25b, as will be mentioned later on referring to FIG. 6, control print original positions in accordance with the sheet width. These control circuits 25a, 25b shift the print data to be inputted, corresponding to a decode signal (a sheet width signal) transmitted from the main control unit 10 (see FIG. 2).

The LED light emitting control circuits 26a, 26b generate control signals of the LED heads 31, 41 in accordance with outputs of the data counter circuits 24a, 24b. These control signals are a shift pulse corresponding to the print data, a latch signal (see FIG. 4) for latching the print data to the LED head, and a light emitting signal (see FIG. 4) for causing the LED head to emit the light.

Read circuits 27a, 27b generate read addresses of a FIFO memory 15 and a buffer memory 16 which will be explained later on in accordance with the outputs of the data counter circuits 24a, 24b.

The FIFO memory 15 buffers the reverse-side print data of the host control unit 11. The FIFO memory 15 is composed of a FIFO memory for storing the print data for two lines, and performs a role of absorbing velocities of the host control unit 11 and of the reverse-side print control unit 12. The data in the FIFO memory 15 is read based on a 64-bit unit in accordance with the read address of the read circuit 27a.

The buffer memory 16 buffers the right-side print data of the host control unit 11. As shown in FIG. 1, the transfer position of the reverse-side printing mechanism 3 is spaced the distance L away from the transfer position of the right-side printing mechanism 4. The host control unit 11 consecutively outputs the print data for the right side (a first page) and the reverse side (a second page). It is therefore required for matching the print on the right side with the print on the reverse side that the right-side print data be outputted with a delay corresponding to the distance L behind the reverse-side print data.

The buffer memory 16 is, the right-side print data being delayed corresponding to the distance L, stored with the right-side print data. The data in the buffer memory 16 is read based on the 64-bit unit in accordance with the read address of the read circuit 27b.

An operation of this print control unit is explained. The quartz oscillator 17 is connected to the reverse-side print control unit 12. The signal select circuit 21a of the print control unit 12 is so set as to select the internal reference clocks CL500N, CL100N. Further, the signal select circuit 23a of the print control unit 12 is so set as to select the internal horizontal synchronous signal PHSP.

In the right-side print control unit 13, the signal select circuit 21b is so set as to select the reference clocks EXCL500N, EXCL100N from outside. The reference clocks CL500N, CL100N of the print control unit 12 are inputted as external clocks to the signal select circuit 21b.

Further, the signal select circuit 23b is so set as to select the external horizontal synchronous signal PHSP. The horizontal synchronous signal PHSP2 into which the horizontal synchronous signal PHSP1 of the print control unit 12 is delayed by the delay circuit 14, is inputted as an external horizontal synchronous signal to the signal select circuit 23b.

Therefore, in the print control unit 12, the respective circuits 22a, 24a, 26a operate corresponding to the reference clocks CL500N, CL100N generated by the clock generation circuit 20a. Then, the data counter circuit 24a creates a count value indicating a position of the print data in accordance with the horizontal synchronous signal PHSP generated by the horizontal synchronous signal generation circuit 22a.

Corresponding to this count value, the read circuit 27a reads the print data from the FIFO memory 15. The print data are outputted line by line to the LED head 31 via the start-of-print position adjusting circuit 25a. Synchronizing with this read operation, the LED light emitting control circuit 26a generates and output a shift pulse, a latch signal (see FIG. 4), and a light emitting signal (see FIG. 4) to the LED head 31. The LED head 31, as will be explained referring to FIG. 5, operates to emit the light.

Further, in the print control unit 13, the respective circuits 22b, 24b, 26b operate corresponding to the reference clocks CL500N, CL100N generated by the clock generation circuit 20a. Then, the data counter circuit 24b creates a count value indicating a position of the print data in accordance with the horizontal synchronous signal PHSP2 into which the horizontal synchronous signal PHSP1 generated by the horizontal synchronous signal generation circuit 22a is delayed.

Corresponding to this count value, the read circuit 27b reads the print data from the buffer memory 16. The print data are outputted line by line to the LED head 41 via the start-of-print position adjusting circuit 25b. Synchronizing with this read operation, the LED light emitting control circuit 26b generates and output the shift pulse, the latch signal (see FIG. 4), and the light emitting signal (see FIG. 4) to the LED head 41. The LED head 41, as will be explained referring to FIG. 5, operates to emit the light.

Thus, the reference clock and the horizontal synchronous signal of the reverse-side print control unit 12 are used for the reference clock and the horizontal synchronous signal of the right-side print control unit 13. It is therefore feasible to match the print position on the right side with the print position on the reverse side even when controlling the prints on the right and reverse sides, independently.

Further, the right- and reverse-side print control units 12, 13 are provided with the signal select circuits 21a, 23a, 21b, 23b and are thus given the same circuit configuration. Hence, the print control units are composed of LSIs and can be therefore mass-produced. Accordingly, the costs for the right- and reverse-side print control units can be reduced.

Figure 5:
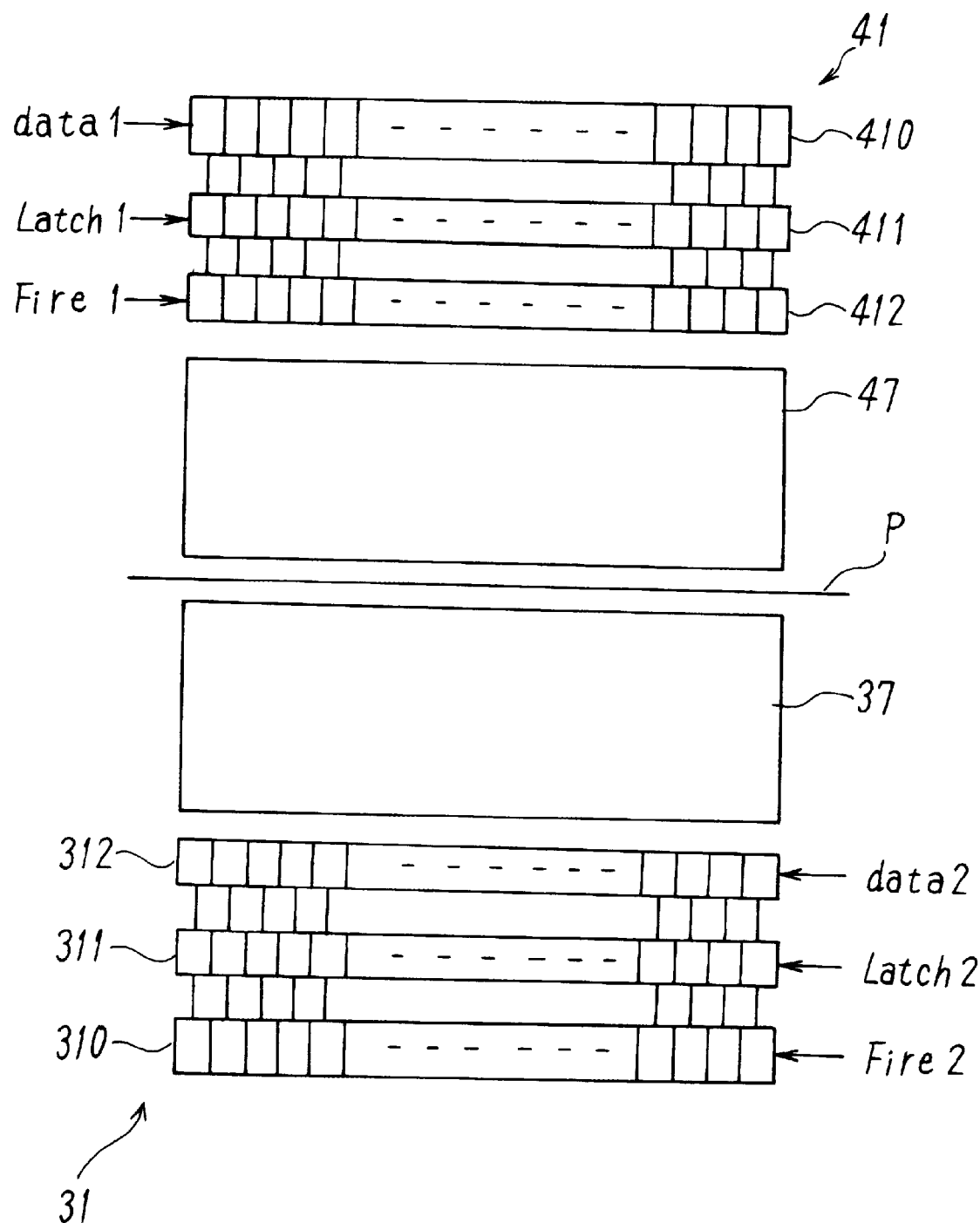
FIG. 5 is a block diagram showing an LED head in FIG. 3.
Figure 7:
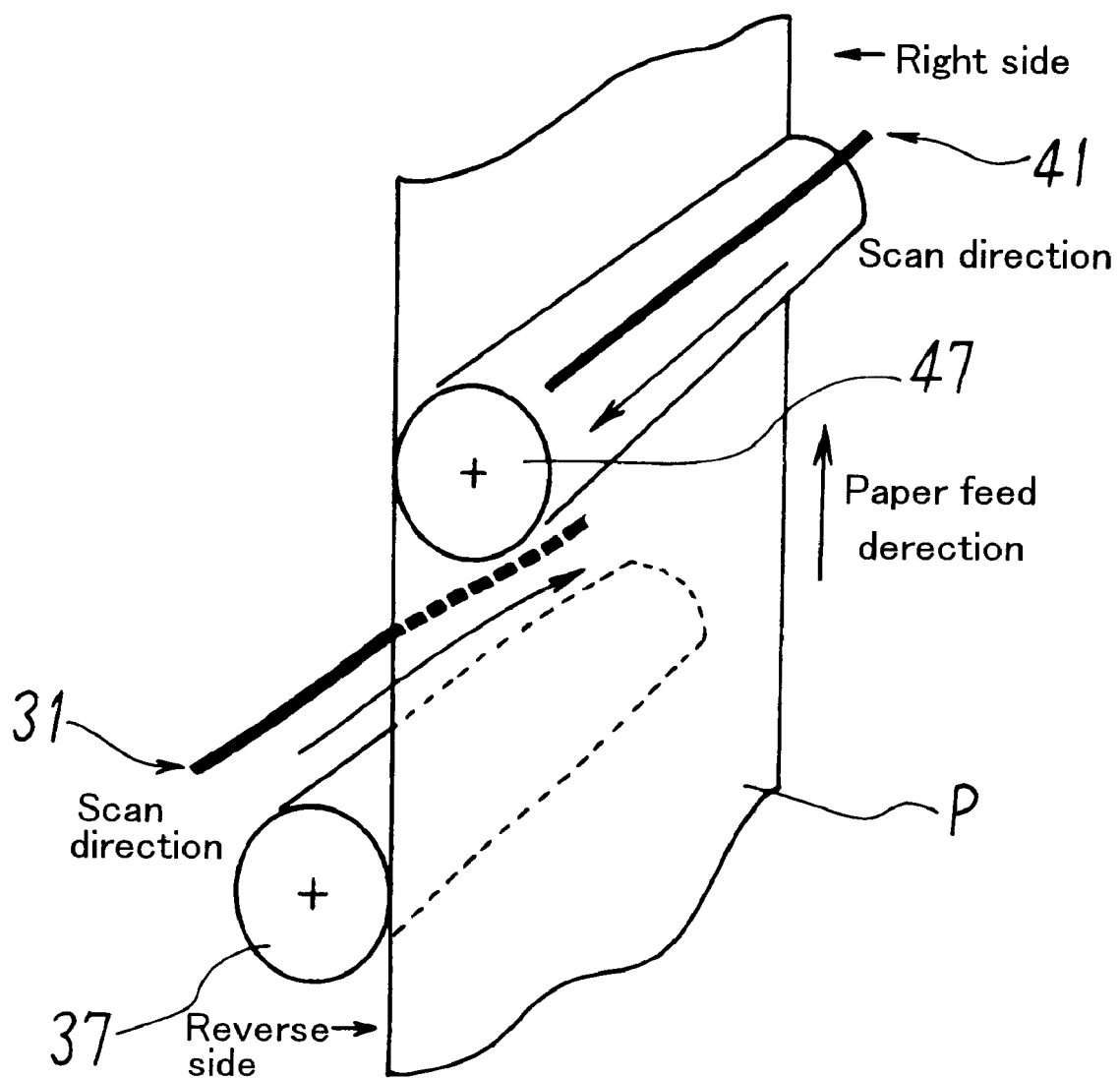
FIG. 7 is an explanatory diagram showing a scan direction of the LED head in FIG. 5.

FIG. 5 is a block diagram of the LED head shown in FIGS. 2 and 3. FIG. 6 is an explanatory diagram showing the start of print position of the LED head. FIG. 7 is an explanatory diagram showing a scan direction of the LED head.

As shown in FIG. 5, the right-side LED head 41 includes a shift register 410 for shifting in-series print data (right-side print data) data1. The shift register 410 possesses bits of which the number corresponds to the number of light emitting elements, and shifts the print data corresponding to the shift pulse. The shift register 410 is provided with a latch circuit 411 for latching the data in the shift register 410 in accordance with a latch signal Latch1.

Each latch circuit 411 is provided with light emitting elements (LEDs) 412 for emitting the light corresponding to a light emitting signal Fire1. There are provided along the photosensitive drum 47 the LEDs 412 of which the number corresponds to the number of print dots of one line.

The reverse-side LED head 31 includes a shift register 310 for shifting in-series print data (reverse-side print data) data2. The shift register 310 possesses bits of which the number corresponds to the number of light emitting elements, and shifts the print data corresponding to the shift pulse. The shift register 30 is provided with a latch circuit 311 for latching the data in the shift register 310 in accordance with a latch signal Latch2.

Each latch circuit 311 is provided with light emitting elements (LEDs) 312 for emitting the light corresponding to a light emitting signal Fire2. There are provided along the photosensitive drum 37 the LEDs 312 of which the number corresponds to the number of print dots of one line.

Shift (scan) directions of the print data on the right and reverse sides are set opposite on the right and reverse sides. As shown in FIGS. 6 and 7, the LED heads 31, 41 are disposed so that the transfer (scan) directions of the print data are set opposite on the right and reverse sides.

If the transfer directions of the print data are the same on the right and reverse sides, it is required that the print data on the right or reverse side be converted in reverse by the print control unit or the host control unit. In this embodiment, the scan directions of the LED heads 31, 41 are set opposite to each other, and hence there is required such a complicated operation that the print data on the right and reverse sides are reversed on the side of the control unit.

Further, since the printing is effected on the sheets having a variety of sheet widths, the print original point is required to change. As shown in FIG. 6, the print original point of the 1-line print data on the right side is not varied, however, the print original point of the 1-line print data on the reverse side changes corresponding to the sheet width. Therefore, the start-of-print position adjusting circuit 25a (see FIG. 3) for the reverse side, shifts the reverse-side print data in the line direction in accordance with a sheet width signal of the main control unit 10.

With the operation thus done, the print original points on the double sides can be easily made coincident with each other in accordance with the sheet width.

Figure 8:
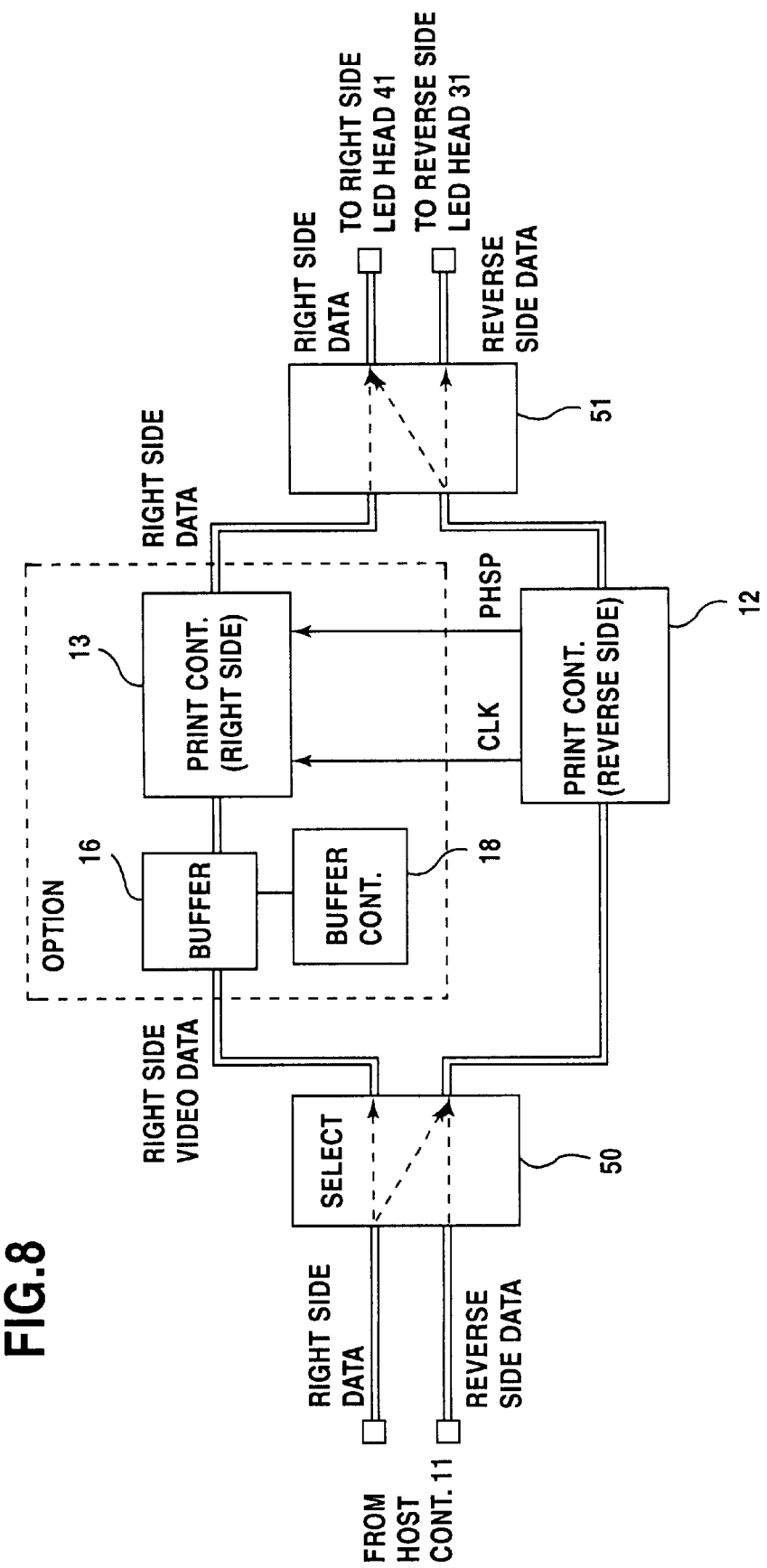
FIG. 8 is a block diagram showing another embodiment of the present invention.
Figure 9:
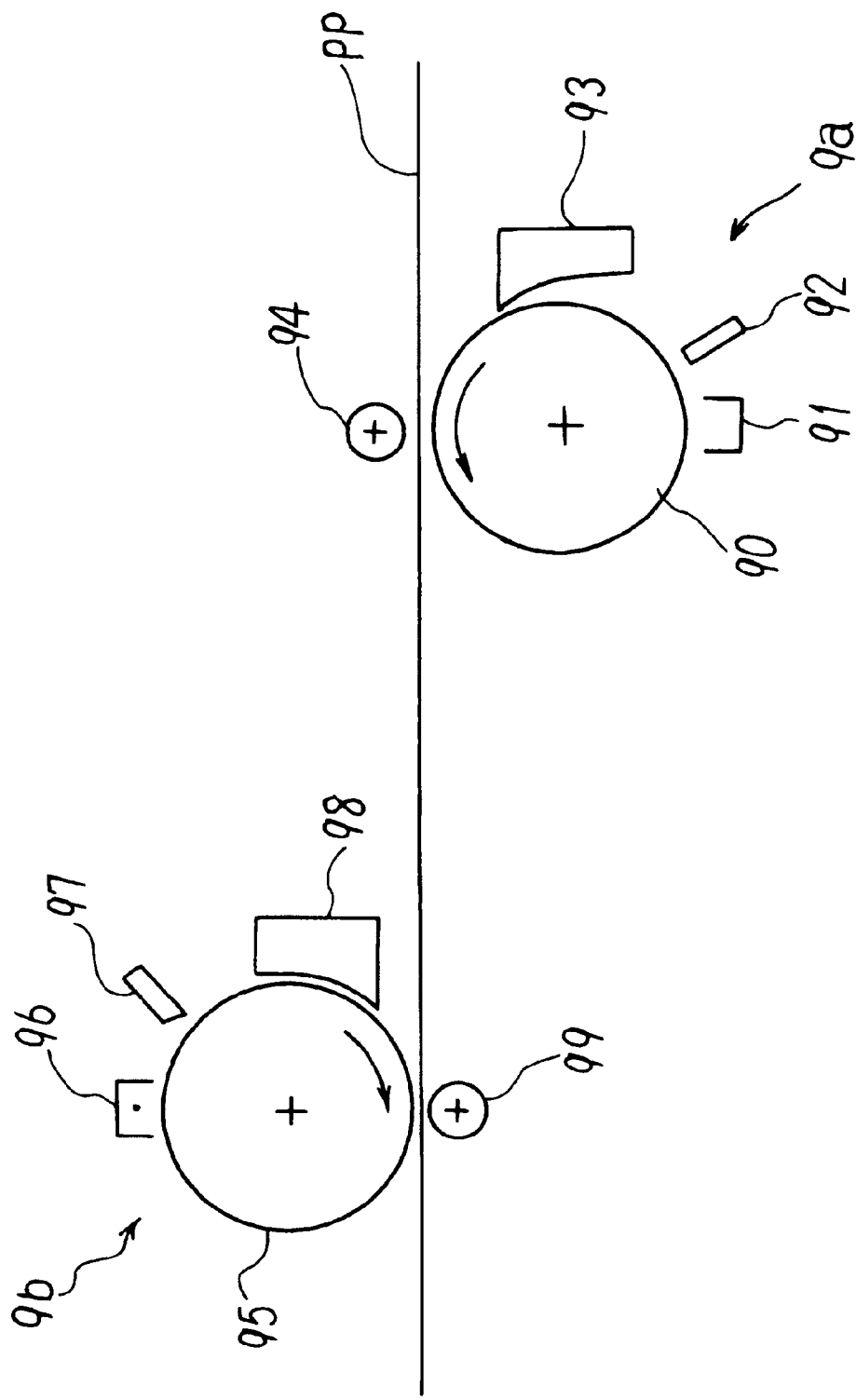
FIG. 9 is an explanatory view showing the prior art.

FIG. 8 is a block diagram showing another embodiment of the present invention.

Referring to FIG. 8, the same components as those shown in FIGS. 2 and 3 are marked with the like numerals. A first selector 50 receives inputs of the right-side print data and the reverse-side print data. The first selector 50 outputs, when in the double-side printing, the right-side print data to the right-side print control unit 13 and the reverse-side print data to the reverse-side print control unit 12. Then, the first selector 50 outputs, when in the one-side printing, the right-side print data to the reverse-side print control unit 12.

A buffer memory control unit 18 controls the buffer memory 16 shown in FIG. 3. A second selector 51 receives inputs of the right-side print data of the right-side print control unit 13 and the reverse-side print data of the reverse-side print control unit 12. The second selector 51 outputs, when in the double-side printing, the right-side print data to the right-side LED head 41 and the reverse-side print data to the reverse-side LED head 41. Then, the second selector 51 outputs, when in the one-side printing, the right-side print data from the reverse-side print control unit 12 to the right-side LED head 31.

It is taken into consideration in this embodiment that the perfecting apparatus for executing the prints on the double sides of the sheet is diverted to the one-side printing apparatus for executing the print on only one side of the sheet. As discussed above, the right-side printing mechanism 4 is spaced the distance L away from the reverse-side printing mechanism 4, and therefore the right-side print control unit 4 requires the buffer memory 16. The diversion of the perfecting apparatus to the one-side printing apparatus involves providing the right-side printing mechanism 4 and the right-side print control unit 13. That is, there are provided the single printing mechanism and the single print control unit.

The utilization of the construction of the perfecting apparatus has such defect that the apparatus is the one-side printing apparatus, and nevertheless the buffer memory 16 is needed. Alternatively when diverted to the one-side printing apparatus, there must be a necessity for preparing the right-side print control unit from which the buffer memory 16 is eliminated.

For utilizing the construction of the perfecting apparatus to the one-side printing apparatus, in this embodiment, the selectors 50, 51 are provided, and the right-side print data is processed by the reverse-side print control unit 12 and outputted to the right-side LED head 41. If done in this way, in the one-side printing apparatus, the above construction can be actualized by providing the right-side printing mechanism 4 and the reverse-side print control unit 12. Therefore, even when utilizing the construction of the perfecting apparatus, the buffer memory becomes unnecessary, and the costs for the one-side printing apparatus can be decreased. Further, the construction of the perfecting apparatus can be utilized as it is, and hence the costs can be further reduced.

In addition to the embodiments discussed above, the present invention may be modified as follows:

(1) The electrophotographic mechanism has been exemplified as the printing mechanism, however, printing mechanism for forming images through exposures implemented otherwise, are applicable.

(2) The LED head has been exemplified as a exposure source, however, there may also be used other exposure sources such as a liquid crystal shutter mechanism and a laser scan mechanism etc.

The present invention has been discussed so far by way of the embodiments but may be modified within the scope of the gist of the present invention, and those modifications are not excluded from the range of the present invention.

As discussed above, the present invention exhibits effects which follow.

Because of providing the first print control unit for controlling the one-line exposure on the right or reverse side by use of the horizontal synchronous signal and the second print control unit for controlling the one-line exposure on the reverse or right side by use of this horizontal synchronous signal, the print start timing on the right side can be synchronized with the print start timing on the reverse side. Even when provided with the right-side print control unit and the reverse-side print control unit, it is feasible to prevent the deviation in terms of the printing position between the right side and the reverse side.

Further, since the horizontal synchronous signal is used, this can be easily attained.

What is claimed is:

1. A double side printing apparatus for executing prints on both sides of a recording medium, comprising:

a first image forming unit including a first exposure source for forming an image on one surface of said recording medium by exposing an image on one line to a light from the first exposure source;

a second image forming unit including a second exposure source for forming an image on the other surface of said recording medium by exposing an image on one line to a light form the second exposure source;

a first print control unit for controlling the one-line image exposure by said first exposure source to print a first plurality of lines in accordance with a horizontal synchronous signal; and a second print control unit for controlling the one-line image exposure by said second exposure source to print a second plurality of lines, synchronizing with the horizontal synchronous signal such that exposure of each of the second plurality of lines is synchronized with exposure of a respective one of the first plurality of lines.

2. A double side printing apparatus according to claim 1, wherein the horizontal synchronous signal is a first horizontal synchronous signal, and further comprising:

a delay circuit for generating a second horizontal synchronous signal obtained by delaying the first horizontal synchronous signal, wherein said second print control unit operates synchronizing with the second horizontal synchronous signal.

3. A double side printing apparatus according to claim 2, wherein said delay circuit is capable of making a delay quantity variable.

4. A double side printing apparatus according to claim 1, wherein said first print control unit includes a first generation circuit for generating the horizontal synchronous signal, a first select circuit for selecting any one of the horizontal synchronous signal generated and a horizontal synchronous signal given from outside, and a first control circuit for controlling an exposure of an image on one line to the light from said first exposure source in accordance with the selected horizontal synchronous signal, said second print control unit includes a second generation circuit for generating the horizontal synchronous signal, a second select circuit for selecting any one of the horizontal synchronous signal generated and a horizontal synchronous signal given from outside, and a second control circuit for controlling an exposure of an image on one line to the light from said second exposure source in accordance with the selected horizontal synchronous signal, said first select circuit of said first print control unit is so set as to select the horizontal synchronous signal given from said first generation circuit, and said second select circuit of said second print control unit is so set as to select the horizontal synchronous signal given from said first generation circuit.

5. A double side printing apparatis according to claim 1, wherein said first print control unit controls the exposure of the image on each of the first plurality of lines to the light from said first exposure source, and said second print control unit controls the exposure of the image on each of the second plurality of line to the light from said second exposure source in accordance with the same clock as the reference clock.

6. A double side printing apparatus according to claim 5, wherein said first print control unit includes a first generation circuit for generating a reference clock, a first select circuit for selecting any one of the reference clock generated and a clock given from outside, and a first control circuit for controlling the exposure of the image on one line to the light from said first exposure source in accordance with the selected clock, said second print control unit includes a second generation circuit for generating a reference clock, a second select circuit for selecting any one of the reference clock generated and a clock given from outside, and a second control circuit for controlling the exposure of the image on one line to the light from said second exposure source in accordance with the selected clock, said first select circuit of said first print control unit is so set as to select the generated reference clock, and said second select circuit of said second print control unit is so set as to select the clock given from said first generation circuit.

7. A double side printing apparatus according to claim 1, wherein said second print control unit is provided with a buffer memory for storing print data having a quantity corresponding to a distance from an image forming position on said recording medium of said first image forming unit to an image forming position on said recording medium of said second image forming unit.

8. A double side printing apparatus according to claim 7, further comprising a first selector for switching over the print data to said first print control unit from said second print control unit, and a second selector for outputting the print data from said first print control unit to said second exposure source of said second image forming unit.

9. A double side printing apparatus according to claim 1, wherein said first exposure source and said second exposure source are disposed so that scan directions of said first exposure source and of said second exposure source are opposite to each other.

10. A double side printing apparatus according to claim 9, wherein said first print control unit further includes a shift circuit for shifting print data corresponding to one line in accordance with a width of said recording medium.

11. A double side printing apparatus according to claim 9, wherein said first image forming unit includes a first photosensitive drum exposed to an image of the light from said first exposure source, a first developing unit for developing the image on said first photosensitive drum, and a first transferring unit for transferring the image on said first photosensitive drum onto one surface of said recording medium, and said second image forming unit includes a second photosensitive drum exposed to an image of the light from said second exposure source, a second developing unit for developing the image on said second photosensitive drum, and a second transferring unit for transferring the image on said second photosensitive drum onto the other surface of said recording medium.

12. A double side printing apparatus according to claim 11, wherein each of said first exposure source and said second exposure source is composed of an LED print head.

* * * * *

UNITED STATES PATENT AND TRADEMARK OFFICE
CERTIFICATE OF CORRECTION

PATENT NO. : 6,232,998 B1
DATED : May 15, 2001
INVENTOR(S) : Motohiro Tokairin et al.

It is certified that error appears in the above-identified patent and that said Letters Patent is hereby corrected as shown below:

<u>Title page,</u>
Item [73], change the Assignee's city "Kanagawa" to -- Kawasaki --.

Signed and Sealed this

Twenty-eighth Day of August, 2001

Attest:

*Attesting Officer*

NICHOLAS P. GODICI
*Acting Director of the United States Patent and Trademark Office*